(12) United States Patent
Zhao et al.

(10) Patent No.: US 11,755,976 B2
(45) Date of Patent: Sep. 12, 2023

(54) METHOD FOR PREDICTING OXYGEN LOAD IN IRON AND STEEL ENTERPRISES BASED ON PRODUCTION PLAN

(71) Applicant: DALIAN UNIVERSITY OF TECHNOLOGY, Liaoning (CN)

(72) Inventors: Jun Zhao, Liaoning (CN); Feng Jin, Liaoning (CN); Guanghui Yang, Liaoning (CN); Wei Wang, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 230 days.

(21) Appl. No.: 17/297,939

(22) PCT Filed: Jul. 28, 2020

(86) PCT No.: PCT/CN2020/105124
§ 371 (c)(1),
(2) Date: May 27, 2021

(87) PCT Pub. No.: WO2021/189739
PCT Pub. Date: Sep. 30, 2021

(65) Prior Publication Data
US 2022/0318714 A1    Oct. 6, 2022

(30) Foreign Application Priority Data
Mar. 23, 2020   (CN) .......................... 202010205754.6

(51) Int. Cl.
*G06Q 10/06*    (2023.01)
*G06Q 10/0637*    (2023.01)
(Continued)

(52) U.S. Cl.
CPC . *G06Q 10/06375* (2013.01); *G06Q 10/06313* (2013.01); *G06Q 50/04* (2013.01)

(58) Field of Classification Search
None
See application file for complete search history.

(56) References Cited

U.S. PATENT DOCUMENTS 5,327,357 A * 7/1994 Feinstein .............. C21C 7/0685
75/375
2007/0250215 A1 * 10/2007 Jia ....................... G05B 13/048
700/274

(Continued)

OTHER PUBLICATIONS

Meradi et al. ("Prediction of bath temperature using neural networks." World Academy of Science, Engineering and Technology 24 (2008): 946-950, International Journal of Mathematical, Computational, Physical, Electrical, and Computer Engineering vol. 2 No. 12).*

*Primary Examiner* — Matthew D Henry
(74) *Attorney, Agent, or Firm* — SALIWANCHIK, LLOYD & EISENSCHENK

(57) ABSTRACT

The present disclosure discloses a method for predicting oxygen load in iron and steel enterprises based on production plan, which relates to influencing factor extraction, neural network modeling and similar sequence matching technologies. The method uses the actual industrial operation data to first extract the relevant data such as the production plan and production performance of converter steel-making, analyze the influencing factors, and extract the main influencing variables of oxygen consumption. Then, the neural network prediction model of oxygen consumption of a single converter is established, the mean square error is taken as the evaluation index, and the predicting result of time granularity of a converter in the blowing stage is given. Finally, in combination with the information of smelting time and smelting duration of each device in the converter production plan, the prediction value of oxygen load in a planned time period is given.

1 Claim, 5 Drawing Sheets

(51) Int. Cl.
*G06Q 10/0631* (2023.01)
*G06Q 50/04* (2012.01)

(56) References Cited

U.S. PATENT DOCUMENTS

2019/0278879 A1* 9/2019 Singh ................ G06F 30/20
2020/0065690 A1* 2/2020 Neri ................ G06N 3/084
2022/0104737 A1* 4/2022 Smit ................ G06N 3/044

* cited by examiner

METHOD FOR PREDICTING OXYGEN LOAD IN IRON AND STEEL ENTERPRISES BASED ON PRODUCTION PLAN

CROSS-REFERENCE TO RELATED APPLICATIONS

This application is the U.S. national stage application of International Patent Application No. PCT/CN2020/105124, filed Jul. 28, 2020: which claims the benefit under 35 U.S.C. § 119 of Chinese Application No. 202010205754.6 filed Mar. 23, 2020; the disclosures of each of which are incorporated herein by reference in their entirety.

TECHNICAL FIELD

The present disclosure relates to the field of information technology, in particular to a method for predicting oxygen load in iron and steel enterprises based on production plan.

BACKGROUND

Energy saving and emission reduction has always been one of the key production targets in iron and steel enterprises. Oxygen is an important energy source in iron and steel enterprises, and its rational utilization is an important means to reduce the cost of enterprises. The biggest consumption units of oxygen are converters and blast furnaces. The production process of the two processes leads to the intermittent characteristics of oxygen consumption, and the system pressure shows an unstable trend with the fluctuation of oxygen consumption. Because a dispatcher cannot accurately predict the process, there will be an oversupply of oxygen for a period of time, and the system pressure will rise. At this time, in order to ensure the stable system pressure and stable production operation, the dispatcher has to empty (release) the redundant low-pressure oxygen to inhibit the safety valve from jumping, so as to reduce the system pressure, which leads to the waste of oxygen resources and the reduction of energy utilization rate. At the same time, when multiple converters are blown intensively, the demand for oxygen rises sharply, and an air compressor unit cannot produce with variable load in a short time, so it cannot meet the production demand, resulting in the pressure drop of the pipe network and affecting the normal production of enterprises. In iron and steel enterprises, oxygen production, oxygen storage and oxygen consumption constitute an oxygen system, which are closely connected and dynamically balanced. When failure occurs or violent fluctuation occurs in a link, it will affect the whole system, so as to destroy the dynamic balance of the system, and then affect the normal production.

At present, the commonly used oxygen load predicting method is data-driven to complete the oxygen load predicting in time granularity. According to the historical data, a kernel learning model represented by neural network and a support vector machine, a predicting model based on a fuzzy system, etc., are used to carry out the iterative mechanism predicting algorithm (Bums E, Rural W. Iterative-deepening search with on-line tree size prediction [J]. Annals of Mathematics and Artificial Intelligence, 2013, 69(2): 183-205.) (Zhang L, Zhou W D, Chang P C, et al. Iterated time series prediction with multiple support vector regression models [J]. Neurocomputing, 2013, 99: 411-422.), or divide the data into particles with different lengths taking the characteristics of staged production into account, then use the data segment as the basic analysis unit for fuzzy clustering, fuzzy reasoning, etc., and finally complete the prediction of oxygen load. (Han Zhongyang, Prediction and scheduling method and application of gas energy system in steel-making process [D]. Dalian University of Technology, 2016). The SVM is used to establish a model to predict the oxygen consumption of a single furnace, but the predicting results exist in the form of total amount points, which cannot be predicted in time granularity and cannot meet the demand of actual production. (Jiang Weijie, Research on prediction and optimal scheduling model of oxygen system in iron and steel enterprises [D]. Tianjin University of Technology, 2017.)

However, these methods only analyze the historical oxygen consumption data, and then use the algorithm to predict. However, when there is a sudden change in the production plan, it is impossible to make a corresponding prediction only through historical data. The change rule of oxygen consumption is closely related to the schedule of production plan. By extracting the schedule of production plan and combining with historical data, the predicted change trend not only can be explained from the mechanism, but also the accuracy is better. Therefore, it is necessary to design a method for predicting oxygen consumption load combined with production plan.

SUMMARY

The purpose of the present disclosure is to provide a method for predicting oxygen load in iron and steel enterprises based on production plan, comprising: first extracting the relevant data such as the production plan and production performance of converter steel-making, analyzing the main influencing factors of oxygen consumption, extracting input variables which have the greatest influence on oxygen consumption of a single furnace, and establishing a prediction model of total amount of oxygen consumption of a single converter furnace based on a neural network. Then, the model predicting results are matched with the historical sample data in model, the mean square error is taken as the evaluation standard, and the oxygen load prediction value in time granularity in a single furnace is given. Finally, the method is extended to the iron-making process for model prediction, and the prediction values in time granularity are added linearly to realize the prediction of total amount of oxygen consumption in iron and steel enterprises.

To achieve the above purpose, the present disclosure provides the following scheme.

A method for predicting oxygen load in iron and steel enterprises based on production planning specifically comprises the steps of:

(1) extracting historical production plan and historical production performance data of iron-making and steel-making, analyzing the factors that have great influence on the oxygen consumption of a single furnace according to the historical data of a converter, then screening a plurality of factors with great influence as input variables of the model, and taking oxygen consumption as output variables of the model;

(2) training the model and adjusting the model parameters, taking the model parameter with the lowest average absolute percentage error as the final model parameter, wherein the model is used to predict the total amount of oxygen consumption in a planned furnace, taking the related information of the planned batch in the future production plan as the input variable;

(3) matching the predicting data with historical samples in model with the minimum mean square error as the standard, and then fitting the oxygen consumption graph on the time scale in a planned time period according to the information of smelting time and smelting duration of each device in the production plan;

(4) according to the existing production plan, predicting the oxygen consumption of each converter device on the time scale, and then linearly summing the prediction curves of all converter devices under the low-pressure oxygen pipe network in time to obtain the oxygen load predicting result of steel-making;

(5) according to the extracted iron-making historical data, predicting the oxygen load of iron-making pipe network, then combining the predicting results with the operations of blast furnace damping, reducing and re-blowing in iron-making production plan, re-fitting the oxygen load prediction curves of blast furnace iron-making, and finally, summing the predicting results of iron-making pipe network and the predicting results of steel-making pipe network to obtain the oxygen load predicting data on the time scale of an oxygen header pipe.

According to the specific embodiment provided by the present disclosure, the present disclosure discloses the following technical effects.

According to the present disclosure, the production plan, the production mechanism and historical data are combined, and a method for predicting oxygen load based on production plan is proposed. After modeling by extracting relevant information, the load of the total amount of oxygen consumption of a converter is predicted, the predicting results are matched with historical information, the distribution of oxygen consumption of this furnace on the time scale is fit, and the trend graph of oxygen consumption in the future is predicted based on the schedule of production plan.

According to the present disclosure, a prediction model combining mechanism and data is constructed on the basis of data driving and production plan, and the future oxygen consumption trend graph can be accurately predicted, thereby providing effective technical support for related optimization and balanced scheduling in on-site production.

BRIEF DESCRIPTION OF THE DRAWINGS

The present disclosure will be further explained with reference to the accompanying drawings.

DETAILED DESCRIPTION

The technical scheme in the embodiments of the present disclosure will be described clearly and completely with reference to the drawings in the embodiments of the present disclosure. Obviously, the described embodiments are only some embodiments of the present disclosure, rather than not all of the embodiments. Based on the embodiments of the present disclosure, all other embodiments obtained by those skilled in the art without paying creative labor belong to the scope of protection of the present disclosure.

In order to make the above objects, features and advantages of the present disclosure more obvious and understandable, the present disclosure will be further explained in detail with reference to the drawings and specific embodiments.

Figure 1:
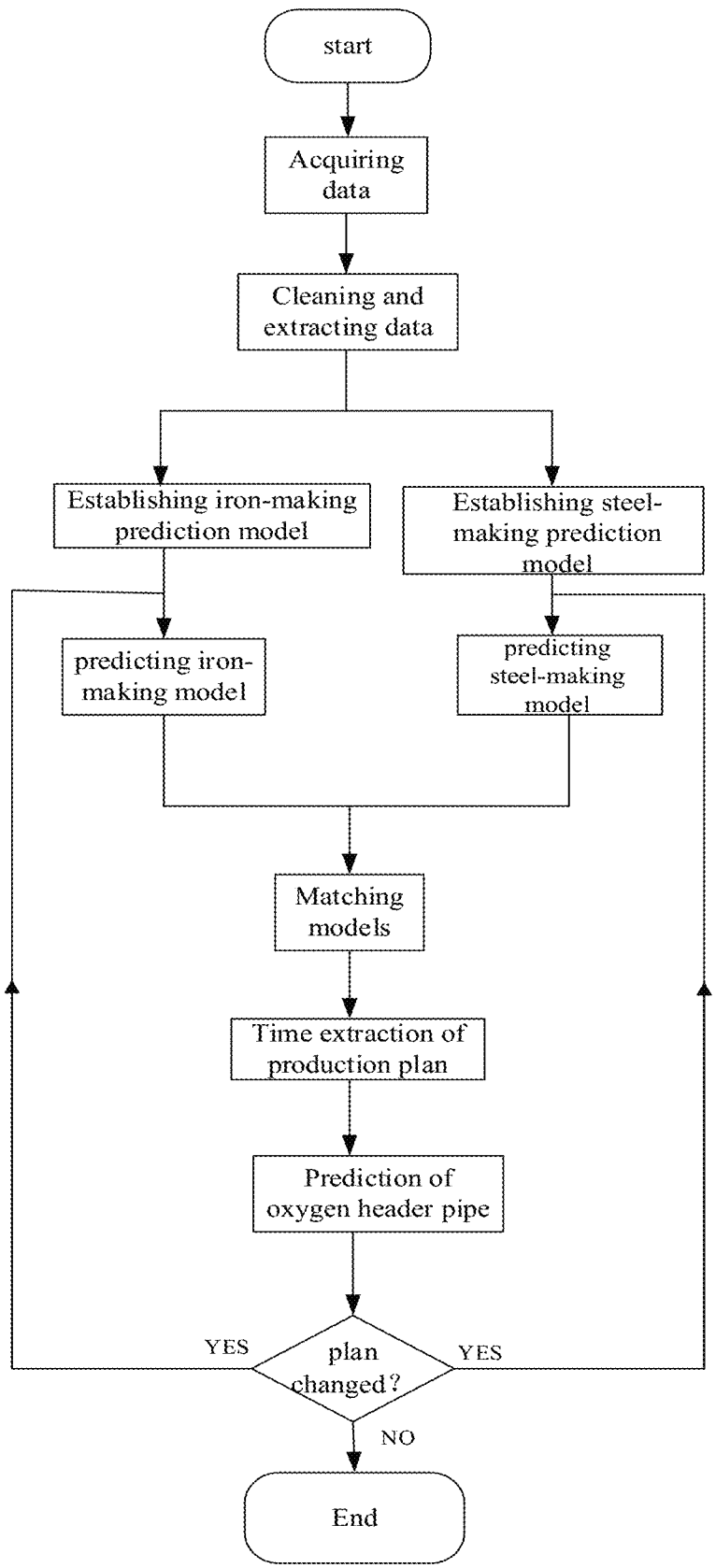
FIG. 1 is a flow chart of the implementation of the present disclosure.
Figure 2:
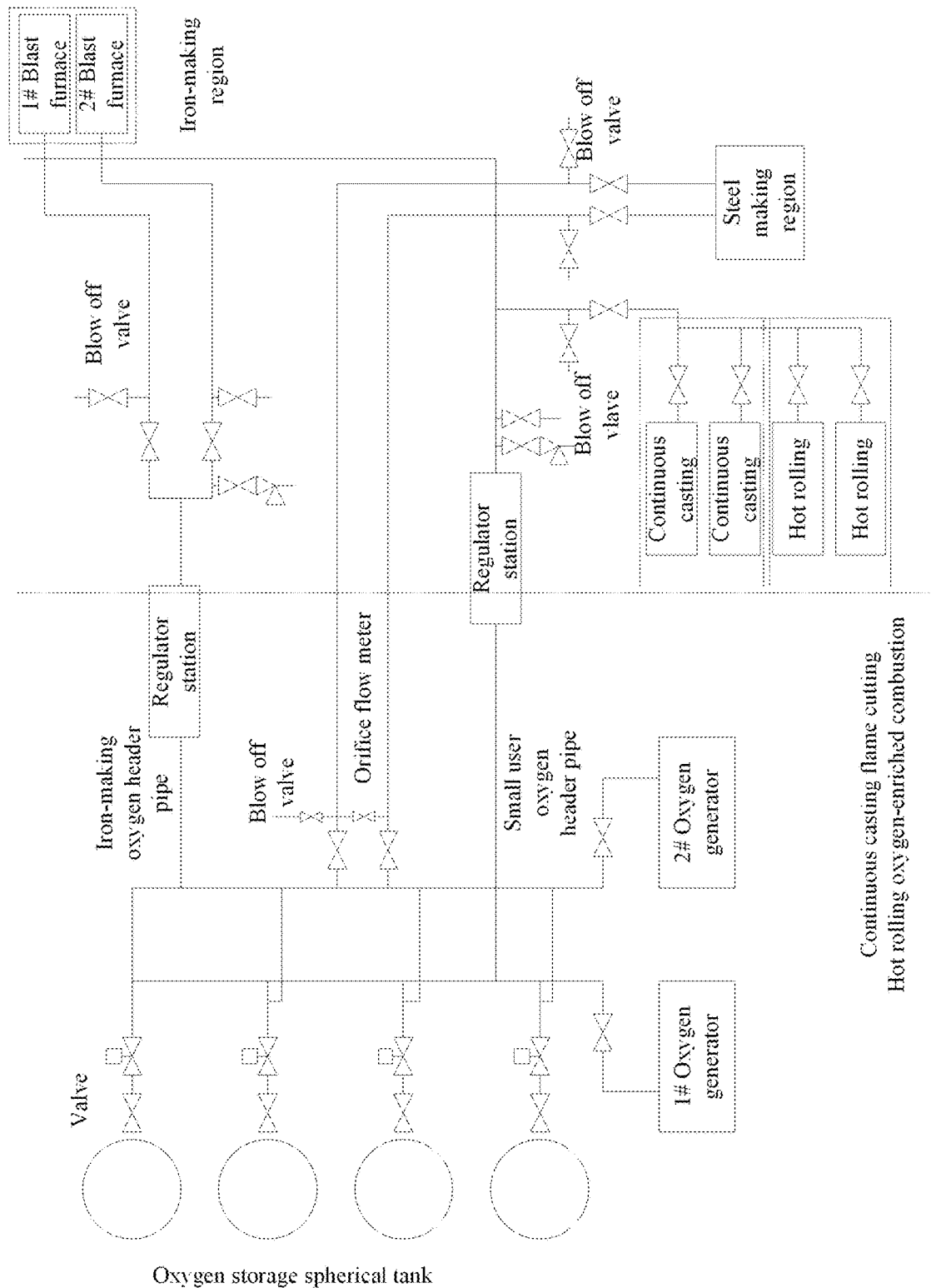
FIG. 2 is a schematic diagram of an oxygen system.

Taking the oxygen system of a large iron and steel enterprise in China as an example, further explanation is made. FIG. 2 is a schematic diagram of an oxygen system. It can be seen from FIG. 2 that small users such as blast furnace iron-making, converter steel-making and hot rolling are the main users of oxygen consumption, in which converter steel-making and blast furnace iron-making account for more than 96% of the total consumption of an oxygen system, while small users such as hot rolling account for relatively less oxygen consumption and relatively stable consumption, so that they are considered as fixed values in the present disclosure. Oxygen consumption in converter steel-making and blast furnace iron-making is characterized by discontinuity, no obvious regularity and large fluctuation range. Production plan is the planning of steel-making and iron-making output and time for iron and steel enterprises in the future, which plays a guiding role in production. At the same time, the information in the planning can also be used to establish the production model, which can be used to predict the changing trend of oxygen consumption in the future. According to the method flow shown in FIG. 1, the specific implementation steps of the present disclosure are as follows.

Step 1: Data Preprocessing

The production plan and production performance table of steel-making and iron-making is extracted from the real-time database of an industrial site, the relevant plan information and oxygen consumption data are filtered, the missing values are filled, and other preprocessing operations are performed.

Step 2: Screening Model Input and Output Variables

Appropriate input and output variables of the model are selected, which will improve the prediction accuracy of the model. The main function of a converter oxygen prediction model is to predict the total amount of oxygen consumption of a single furnace, the output variable of the neural network is the total amount of oxygen consumption of a single furnace, and the input variable of the neural network can be determined by experimental methods such as screening the mechanism model and analyzing the maximum influencing factors.

Through the analysis of the neural network mechanism model, it is determined that the oxygen consumption is related to the production raw materials, auxiliary materials, production processes and other factors. In order to improve the prediction accuracy of the model, the correlation analysis is used for the oxygen consumption and influencing factors in the extracted historical production data of the converter, and the factors that have the greatest influence on the target output variables are screened. Six input variables, including molten iron weight, molten iron temperature, molten iron carbon content, molten iron phosphorus content, end point carbon content and scrap steel quantity, are selected, which are all available variables in the production schedule.

Step 3: Establishing a Model and Training the Model

According to the present disclosure, the neural network algorithm is used to construct the model. The accurate mathematical relationship between input variables and output variables is not needed to be understood. The mapping relationship between input and output is automatically learned through a large number of training samples, which approximates any nonlinear function in theory. The structure of the neural network model is divided into three layers: an input layer, a hidden layer and an output layer. Assuming that the output layer of the model is the Qth layer, assuming that the number of neural nodes in the q(q=1,2, . . . , Q)th layer is $n_q$, the connection coefficient from the jth neural node in the (q-1)th layer to the ith neural node in the qth layer is w, and the relationship between the input and the output of each layer of the network layer is shown in Formula (1):

$$x_i^{(q)} = f(S_i^{(q)}) = \frac{1}{1+e^{-\mu s_i^{(q)}}} \quad (1)$$

$$s_i^{(q)} = \sum_{j=0}^{n_y-1} w_{ij}^{(q)} x_j^{(q-1)} \quad (2)$$

$$f(x) = \frac{1}{1+e^{-x}} \quad (3)$$

wherein $x_i^{(q)}$ is the ith output variable in the qth layer, $s_i^{(q)}$ in Formula (1) is shown in Formula (2), the structure of f relationship in Formula (1) is shown in Formula (3), μ is a set parameter, $s_i^{(q)}$ is the sum of the products of the connection coefficients from the variable in the (q-1)th layer to the corresponding ith node in the qth layer, $x_j^{(q-1)}$ is the jth input variable in the (q-1)th layer, $w_{ij}^{(q)}$ represents the impact of the jth node in the (q-1)th layer on the ith node in the qth layer, when j=0, $w_{i0}^{(q)}=\times 1$, $x_0^{(q-1)}=\theta_i^{(q)}$, where $\theta_i^{(q)}$ represents the threshold of the i-th neuron in the qth layer.

The historical data in the production performance table is extracted, and the input variable selected in Step 2 is taken as the input parameter, so that the input sample is shown in Formula (4); the output variables are used as output parameters, and the relationship between output samples and input samples is shown in Formula (5); the model structure then changes and is trained one by one, and the structure with the lowest Mean Absolute Percentage Error (MAPE) is used as the final model structure, and the MAPE formula is shown in Formula (7).

$$X = [x_b, x_t, x_d, x_p, t_c, e_w] \quad (4)$$

$$Y_{out} = f(x_b, x_t, x_d, x_p, t_c, e_w) \quad (5)$$

$$M_a = \sum_{k=1}^{n} \left|\frac{y_1 - y_2}{y_1}\right| \times \frac{100}{n} \quad (6)$$

where X is n×6 input sample matrix, $x_b$ is a column vector representing molten iron weight of a single converter furnace, $x_t$ is a column vector representing molten iron temperature of a single converter furnace, $x_d$ is a column vector representing molten iron carbon content of a single converter furnace, $x_p$ is a column vector representing molten iron phosphorus content of a single converter furnace, $t_c$ is a column vector representing end point carbon content of a single converter furnace, $e_w$ is a column vector representing scrap steel quantity of a single converter furnace, $Y_{out}$ is a column vector representing the total amount of oxygen consumption of a single converter furnace, the output sample $y_1$ is the actual value, $y_2$ is the prediction value, and n is the predicted total number of converter furnaces.

Step 4: Predicting the Oxygen Consumption Data of a Single Device

The production plan information for a period of time in the future is screened, including molten iron weight, molten iron temperature, molten iron carbon content, molten iron phosphorus content, end point carbon content, scrap steel quantity, and the smelting time and the smelting duration of each device. The factor is predicted as the input variable of the trained model in step 3 to obtain the total amount of oxygen consumption of the corresponding converter furnace:

$$R=(Y_1-Y_2)^2 \quad (7)$$

In the oxygen consumption of a converter, the total amount of oxygen consumption is inevitably different for each additional minute of oxygen blowing time, according to the historical law, there is a certain relationship between the oxygen blowing time of a furnace and the total amount of oxygen consumption of the furnace. Therefore, after the predicted total amount of oxygen consumption in a furnace of a single converter is obtained, according to the total amount of oxygen consumption stored in the database and its corresponding historical data curve, the most matching historical data item and its historical data curve are solved by Formula (7), in which $Y_1$ is the predicted total amount of oxygen consumption in a furnace of a converter, $Y_2$ is the historical data stored in the database, under the target condition of minimum R, the corresponding total amount of oxygen consumption of previous furnaces and corresponding oxygen consumption data in the database are solved, which is shown in Formula (8). Then $y_p$ is obtained after unit conversion of the predicted total consumption, the predicted oxygen data in a future period is calculated according to Formula (9), according to the smelting start time and smelting duration time of each device in the production plan, the predicted oxygen consumption data in a furnace distributed according to the time is obtained:

$$Y_h(t) = [x_1, x_2, x_3, x_4, \ldots, x_n] \quad (8)$$

$$Y_p(t) = \left[y_p \times \frac{x_1}{\sum_{k=1}^{n} x_k}, y_p \times \frac{x_2}{\sum_{k=1}^{n} x_k}, y_p \times \frac{x_3}{\sum_{k=1}^{n} x_k}, \ldots, y_p \times \frac{x_n}{\sum_{k=1}^{n} x_k}\right] \quad (9)$$

where $Y_h(t)$ is the row vector of n variables, which is the corresponding oxygen consumption data, and $Y_p(t)$ represents the converted predicting data.

Step 5: predicting the oxygen consumption data of the oxygen pipe network

In a large iron and steel enterprise, oxygen pipe network comprises steel-making oxygen pipe network, iron-making oxygen pipe network and small user oxygen pipe network. The small user oxygen pipe network consumes stable oxygen and its total amount is very small, accounting for about 2% of the total amount of oxygen consumption, and its change trend has little effect on the total amount, so that it is taken as a fixed value in the model. There are 5 converters under the steel-making oxygen pipe network; each converter carries out the corresponding planned converter smelting production, predicts the smelting production plan of each converter by this model, executes the algorithm in step 4, respectively, then accumulates each prediction curve according to the time to obtain the oxygen load graph under the steel-making oxygen pipe network. the algorithms in steps 2 to 4 are repeated to predict the oxygen load of the blast furnace to obtain the load prediction value of blast furnace oxygen in time granularity. Then, the prediction values of the above iron-making and steel-making pipe networks are cumulatively calculated in time granularity, and the fixed values of the small user oxygen pipe network are subjected to summing calculation to obtain the load prediction of the oxygen pipe network of the whole energy system.

Figure 3:
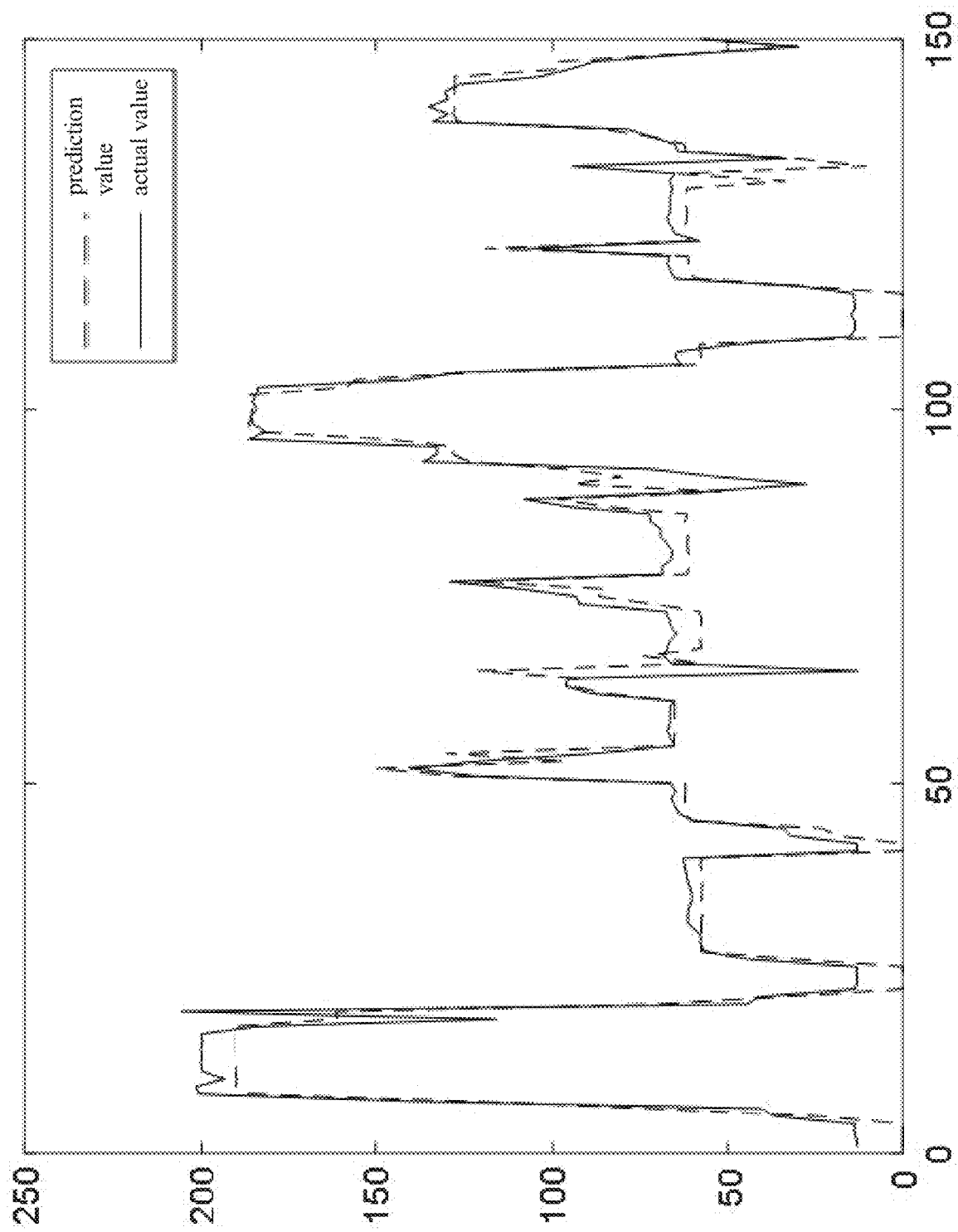
FIG. 3 is a comparison chart of prediction values and actual values of steel-making pipe network in this method.
Figure 4:
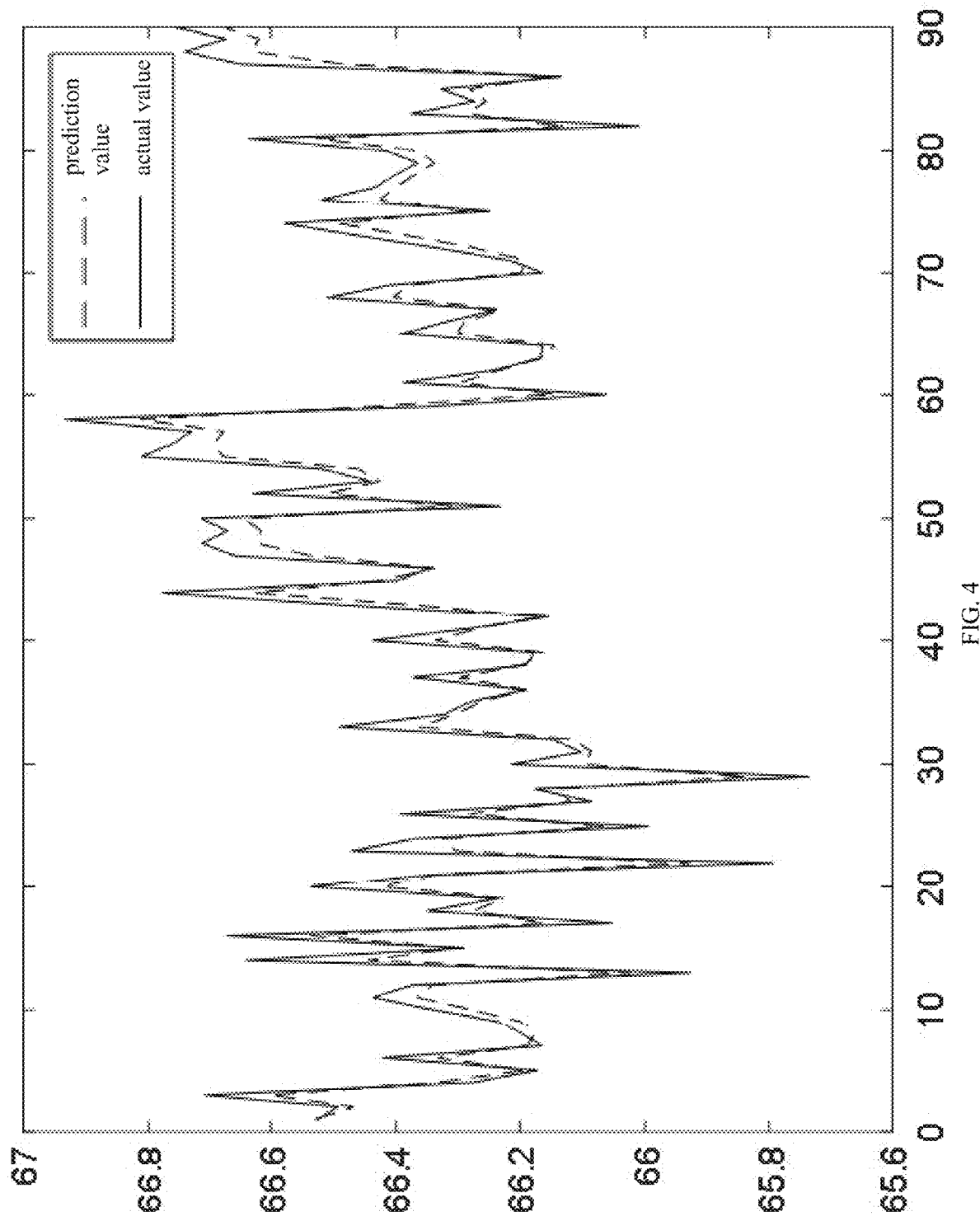
FIG. 4 is a comparison chart of prediction values and actual values of iron-making pipe network in this method.
Figure 5:
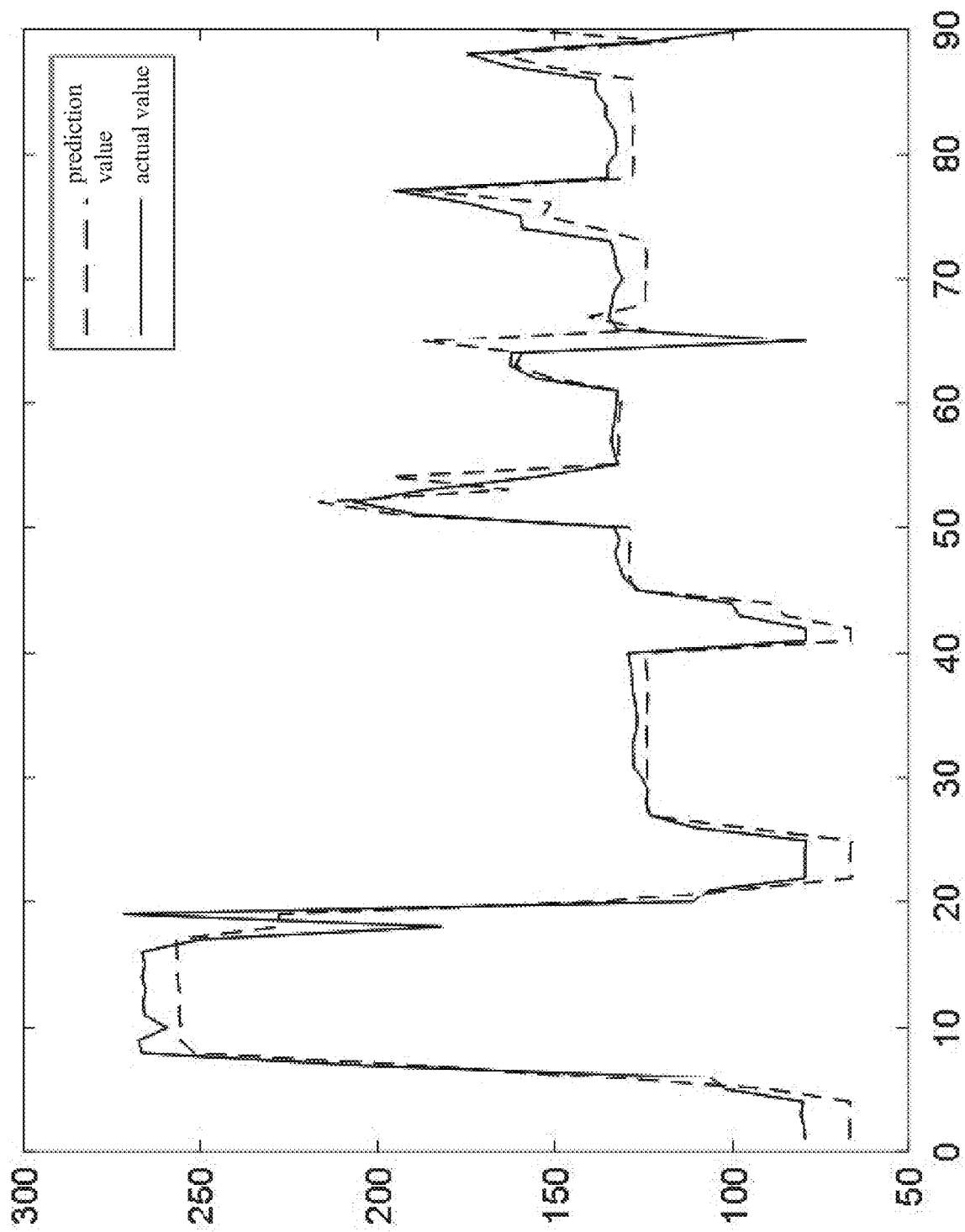
FIG. 5 is a comparison chart of prediction values and actual values of oxygen pipe network in this method.

Combined with FIGS. 3-5 and table 1, it can be seen that compared with BP neural network and a Least Squares Support Vector Machine (LSSVM), the accuracy of the present disclosure is greatly improved. The calculation method of each evaluation index is shown as follows.

The formula of Mean Squared Error (MSE) is shown in Formula (10):

$$M_s = \frac{1}{n}\sum_{m=1}^{n}(\hat{y}_m - y_m)^2 \qquad (10)$$

where n is the total number of measurements, $\hat{y}_m$ is the prediction value, and $y_m$ is the true value.

The Root Mean Squared Error (RMSE) is shown in Formula (11):

$$R_m = \sqrt{\frac{1}{n}\sum_{k=1}^{n}(\hat{y}_s - y_s)^2} \qquad (11)$$

where n is the total number of measurements, $\hat{y}_s$ is the prediction value, and $y_s$ is the true value.

The Mean Absolute Error (MAE) is shown in Formula (12):

$$M_a = \frac{1}{n}\sum_{k=1}^{n}\left|\hat{y}_z - y_z\right| \qquad (12)$$

where n is the total number of measurements, $\hat{y}_s$ is the prediction value, and $y_s$ is the true value.

TABLE 1

Comparison of oxygen load predicting results by three methods

| prediction object | prediction method | MAPE (%) | RMSE(km³/h) | MAE(km³/h) |
|---|---|---|---|---|
| Oxygen load of steel-making pipe network | BP neural network | 23.56 | 12.99 | 9.36 |
|  | LSSVM | 23.23 | 8.53 | 10.85 |
|  | the present disclosure | 4.05 | 6.88 | 5.90 |
| Oxygen load of iron-making pipe network | BP neural network | 0.33 | 0.32 | 0.25 |
|  | LSSVM | 0.17 | 0.09 | 0.07 |
|  | the present disclosure | 0.11 | 0.07 | 0.08 |
| Oxygen load of header pipe network | BP neural network | 28.09 | 24.53 | 19.78 |
|  | LSSVM | 27.74 | 19.69 | 15.31 |
|  | the present disclosure | 7.03 | 9.06 | 7.18 |

The embodiments of the present disclosure have been described in detail with reference to the attached drawings, but the present disclosure is not limited to the above embodiments, and various changes can be made within the knowledge of those skilled in the art without departing from the purpose of the present disclosure.

What is claimed is:

1. A method for predicting oxygen load based on a production plan, comprising:

Step 1:
extracting the production plan and a production performance table of steel-making and iron-making from a real-time database of an industrial site, filtering production plan information and oxygen consumption data, and filling missing values;

Step 2: screening input variables and output variables of a converter oxygen prediction model based on a neural network;
wherein the converter oxygen prediction model is configured to predict a total amount of oxygen consumption of a single converter furnace, the output variables of the neural network are the total amount of the oxygen consumption of the single converter furnace, and the input variables of the neural network are determined by screening a mechanism model and analyzing maximum influencing factors; six input variables, including molten iron weight, molten iron temperature, molten iron carbon content, molten iron phosphorus content, end point carbon content and scrap steel quantity, are selected, which are all available variables in a production schedule;

Step 3: establishing a neural network model as the converter oxygen prediction model and training the neural network model;
wherein a neural network algorithm is used to construct the neural network model, and a mapping relationship between input and output is automatically learned through a large number of training samples, which approximates any nonlinear function in theory; a structure of the neural network model is divided into three layers: an input layer, a hidden layer and an output layer; assuming that the output layer of the neural network model is a Qth layer, assuming that a number of neural nodes in a q(q=1,2, . . . , Q) layer is $n_q$, a connection coefficient from a jth neural node in a (q-1)th layer to an ith neural node in the qth layer is w, and a relationship between the input and the output of each layer of network layers is shown in Formula (1):

$$x_i^{(q)} = f(S_i^{(q)}) = \frac{1}{1+e^{-\mu s_i^{(q)}}} \qquad (1)$$

$$s_i^{(q)} = \sum_{j=0}^{n_y-1} w_{ij}^{(q)} x_j^{(q-1)} \qquad (2)$$

$$f(x) = \frac{1}{1+e^{-x}} \qquad (3)$$

wherein $x_i^{(q)}$ is an ith output variable in the qth layer, $S_i^{(q)}$ in Formula (1) is shown in Formula (2), a structure of f relationship in Formula (1) is shown in Formula (3), μ is a set parameter, $S_i^{(q)}$ is a sum of products of connection coefficients from variables in the (q-1)th layer to an ith neural node in the qth layer, $x_j^{(q-1)}$ is a jth input variable in the (q-1)th layer, $W_{ij}^{(q)}$ represents impact of a jth neural node in the (q-1)th layer on the ith neural node in the qth layer, when j=0, $W_{i0}^{(q)}=-1$, $X_0^{(q-1)}=\theta_i^{(q)}$, where $\theta_i^{(q)}$ represents a threshold of the i-th neural node in the qth layer;
wherein historical data in the production performance table is extracted, and the input variables selected in Step 2 are taken as input parameters, so that an input sample is shown in Formula (4); the output variables are used as output parameters, and a relationship between an output sample and the input sample is shown in Formula (5); wherein a model structure then changes and is trained one by one, and a structure with a lowest Mean Absolute Percentage Error (MAPE) is used as a final model structure, and its formula is shown in Formula (6);

$$X = [x_b, x_t, x_d, x_p, t_c, e_w] \quad (4)$$

$$Y_{out} = f(x_b, x_t, x_d, x_p, t_c, e_w) \quad (5)$$

$$M_a = \sum_{k=1}^{n} \left| \frac{y_1 - y_2}{y_1} \right| \times \frac{100}{n} \quad (6)$$

where X is an n×6 matrix of the input sample, $x_b$ is a column vector representing molten iron weight of the single converter furnace, $x_t$ is a column vector representing molten iron temperature of the single converter furnace, $X_d$ is a column vector representing molten iron carbon content of the single converter furnace, $X_p$ is a column vector representing molten iron phosphorus content of the single converter furnace, $t_c$ is a column vector representing end point carbon content of the single converter furnace, $e_w$ is a column vector representing scrap steel quantity of the single converter furnace, $Y_{out}$ is a column vector representing the total amount of the oxygen consumption of the single converter; furnace as the output sample; wherein $y_1$ is an actual value, $y_2$ is a prediction value, and n is a predicted total number of converter furnaces;

Step 4: predicting oxygen consumption of a single device, which comprises:

screening the production plan information for a period of time in the future, including molten iron weight, molten iron temperature, molten iron carbon content, molten iron phosphorus content, end point carbon content, scrap steel quantity, and smelting time and smelting duration of each device as the input variables of the trained neural network model in step 3, and predicting and obtaining a total amount of oxygen consumption of a corresponding converter furnace:

$$R = (Y_1 - Y_2)^2 \quad (7)$$

wherein in oxygen consumption of a converter, a total amount of the oxygen consumption is inevitably different for each additional minute of oxygen blowing time; according to a historical law, there is a certain relationship between oxygen blowing time of a single converter furnace and the total amount of the oxygen consumption of the single converter furnace; after a predicted total amount of oxygen consumption of a furnace of the converter is obtained, according to a total amount of oxygen consumption stored in the real time database and its corresponding historical data curve, a most matching historical data item and its historical data curve are solved by Formula (7), wherein $Y_1$ is a predicted total amount of oxygen consumption of the furnace of the converter, $Y_2$ is historical data stored in the real time database, under a target condition of minimum R; corresponding total amounts of oxygen consumption of previous furnaces and corresponding oxygen consumption data in the real time database are solved, which is shown in Formula (8); then $y_p$ is obtained after unit conversion of the predicted total amount of the oxygen consumption, predicted oxygen consumption in a future period is calculated according to Formula (9), and according to smelting start time and smelting duration time of each device in the production plan, predicted oxygen consumption of a furnace distributed according to time is obtained:

$$Y_h(t) = [x_1, x_2, x_3, x_4, \ldots, x_n] \quad (8)$$

$$Y_p(t) = \left[ y_p \times \frac{x_1}{\sum_{k=1}^{n} x_k}, y_p \times \frac{x_2}{\sum_{k=1}^{n} x_k}, y_p \times \frac{x_3}{\sum_{k=1}^{n} x_k}, \ldots, y_p \times \frac{x_n}{\sum_{k=1}^{n} x_k} \right] \quad (9)$$

where $Y_n(t)$ is a row vector of n variables, which is corresponding oxygen consumption, and $Y_p(t)$ represents; predicted oxygen consumption by calculating; and Step 5: predicting oxygen consumption data of an oxygen pipe network, wherein the oxygen pipe network comprises a steel-making oxygen pipe network, an iron-making oxygen pipe network and a small user oxygen pipe network, the small user oxygen pipe network consumes stable oxygen and its total amount is very small, accounting for about 2% of a total amount of oxygen consumption, and its change trend has little effect on the total amount of oxygen consumption, so that it is taken as a fixed value in the neural network model; there are 5 converters under the steel-making oxygen pipe network; each converter carries out a corresponding planned converter smelting production, oxygen consumption of each converter is predicted based on the corresponding planned converter smelting production by the neural network model, the formulas in step 4 are executed, respectively, to obtain a prediction curve of each converter, then each prediction curve is accumulated according to time to obtain oxygen consumption in time granularity under the steel-making oxygen pipe network; the formulas in steps 2 to 4 are executed repeatedly to predict oxygen consumption of each blast furnace in the iron-making oxygen pipe network to obtain oxygen consumption in time granularity under the iron-making oxygen pipe network; then, the oxygen consumption of the iron-making oxygen pipe network and the steel-making oxygen pipe network are cumulatively calculated in time granularity, and the fixed value of the small user oxygen pipe network are subjected to summing calculation to obtain the oxygen consumption of the oxygen pipe network.

\* \* \* \* \*